United States Patent [19]

Mulder et al.

[11] Patent Number: 5,396,549
[45] Date of Patent: Mar. 7, 1995

[54] TERMINAL STATION FOR TELECOMMUNICATION BY WIRE

[75] Inventors: Jacob Mulder, Eindhoven, Netherlands; Rolf F.P. Becker, Aldiswil; Zhenhua Wang, Zürich, both of Switzerland

[73] Assignee: U.S. Philips Corporation, New York, N.Y.

[21] Appl. No.: 93,247

[22] Filed: Jul. 16, 1993

[30] Foreign Application Priority Data

Jul. 31, 1992 [EP] European Pat. Off. .......... 92202376

[51] Int. Cl.⁶ .................... H04M 1/58; H04M 1/62
[52] U.S. Cl. ........................ 379/391; 379/390; 379/392
[58] Field of Search .......... 379/390, 391, 392, 394, 379/400, 410, 387, 388, 389

[56] References Cited

U.S. PATENT DOCUMENTS

| | | | |
|---|---|---|---|
| 3,789,155 | 1/1974 | Fensom | 379/394 |
| 4,791,638 | 12/1988 | Fujie | 379/392 |
| 4,796,295 | 1/1989 | Gay et al. | 379/392 |
| 4,983,975 | 1/1991 | Sugino et al. | 379/410 |
| 5,029,203 | 7/1991 | Ikefuji et al. | 379/391 |
| 5,191,606 | 3/1993 | Juang | 379/391 |

FOREIGN PATENT DOCUMENTS

0106936  6/1983  Japan .................. 379/392

OTHER PUBLICATIONS

"Analog MOS Integrated Circuits for Signal Processing" R. Gregorian et al., Wiley 1986, pp. 1-25, 265-277, 280-284.

"Switched current filters", J. B. Hughes et al, IEE Proceedings, vol. 137, Pt. G. No. 2, Apr. 1990, pp. 156-162.

Philips Data Handbook "ICs for Telecom Subscriber Sets, Cordless Telephones, Mobile/Cellular Radio Pagers CA 3089 to PC 4413", Data Handbooks ICO3a and ICO3b, 1991.

Philips Data Handbook "ICs for Telecom Subsrciver Sets, Cordless Telephones, Mobile/Cellular Radio Pagers", PCD4413A to 74HC/HCT7046A.

*Primary Examiner*—James L. Dwyer
*Assistant Examiner*—Scott L. Weaver
*Attorney, Agent, or Firm*—David R. Treacy

[57] ABSTRACT

A telephone set includes an anti-sidetone circuit formed by a feedback loop having a filter in the feedback path. The feedback loop output is substantially equal to the signal produced at the set connection terminals by the microphone. Preferably the filter is composed of two sub-filters connected in cascade, formed of switched capacitors in an integrated circuit. An EEPROM control circuit can be included to permit easy programming during manufacture, to match a selected transmission line impedance.

9 Claims, 2 Drawing Sheets

TERMINAL STATION FOR TELECOMMUNICATION BY WIRE

BACKGROUND OF THE INVENTION

The invention relates to a terminal station for telecommunication by wire, comprising at least two connection terminals for connecting the terminal station to a transmission line of a telecommunication network, and also comprising an anti-sidetone circuit coupled to the connection terminals.

A terminal station of this kind is generally known as an electronic telephone as described in the Philips Data Handbook "ICs for Telecom Subscriber Sets, Cordless Telephones, Mobile/Cellular Radio Pagers CA 3089 to PC 4413", Data Handbooks IC03a and IC03b, 1991.

Page 851 of the handbook IC03a shows a block diagram of such a terminal station, comprising connection terminals a/b, b/a for connecting the terminal station to a telephone line. The terminal station comprises a transmission circuit, for example as realised in the IC type 1067, and a control device in the form of a microcontroller designed for telephony purposes, for example the IC type PCD 3349. Also shown are a keypad coupled to the microcontroller and a microphone and telephone audio output device such as an earpiece or loudspeaker coupled to the transmission circuit.

FIG. 5 on page 1465 of the handbook IC03b shows an anti-sidetone circuit, forming part of the transmission circuit, in the form of a bridge circuit. This bridge circuit, including the line impedance, comprises a balance impedance and two discrete impedances which are included in the branches of the bridge. As is described on page 1464, the line impedance varies substantially as a function of the type and the length of the line. To this end, a value which is optimum for the mean line length of the transmission line is usually chosen for the balance impedance, and the further discrete impedances also have permanently adjusted values.

Integration of these components on a telephone set IC is not very feasible because of the high values of the real and the complex parts of these impedances. Moreover, generally speaking, accurate impedances in an absolute sense cannot be realised on an IC. A further problem is that different countries impose different requirements regarding the line impedance. The prior art solution to this problem has involved using external components connected to the IC.

SUMMARY OF THE INVENTION

It is an object of the invention to provide a terminal station for telecommunication by wire which comprises an anti-sidetone circuit which can be integrated in a simple manner.

Another object of the invention is to eliminate the need for external components to adapt to various national requirements, by providing a universal terminal station which can be readily programmed during manufacturing.

To achieve the first object, a terminal station in accordance with the invention is characterized in that the anti-sidetone circuit comprises a filter which is included in a feedback loop. The feedback loop generates from a microphone signal, a signal which is substantially equal to a signal generated across the connection terminals by the microphone signal. Preferably, the filter is included in the feedback path of the loop.

The invention is based on the recognition of the fact that the anti-sidetone circuit can be simply realised by means of a filter included in a feedback circuit.

An embodiment of a terminal station in accordance with the invention is characterized in that the filter consists of the cascade connection of two normalized sub-filters.

This offers the advantage that the realisation of the anti-sidetone circuit in integrated form is further simplified.

A further embodiment of a terminal station in accordance with the invention is characterized in that the filter is adjustable, and the terminal set includes a control unit which is connected to the filter in order to compensate for the effect of differences in the value of the transmission line impedance with the filter.

This offers the additional advantage that compensation is achieved not only for the various line impedances specified by the authorities in various countries, but also for the actual line length.

A further embodiment of a terminal station in accordance with the invention is characterized in that the filter is constructed by means of switched capacitances.

Because an accurate filter, or the sub-filters, can thus be simply realised, integration of an anti-sidetone circuit adaptable to the line length and the requirements imposed by authorities is thus simplified.

It is to be noted that the reproducibility and the accuracy of the filter to be realised do not depend on the reproducibility and the absolute accuracies of impedances constituting the filter or the sub-filters, but on the ratio of impedances. These ratios can be reproducibly and accurately realised during integration processes.

The invention will be described in detail hereinafter with reference to the drawing.

DESCRIPTION OF THE PREFERRED EMBODIMENT

Figure 1:
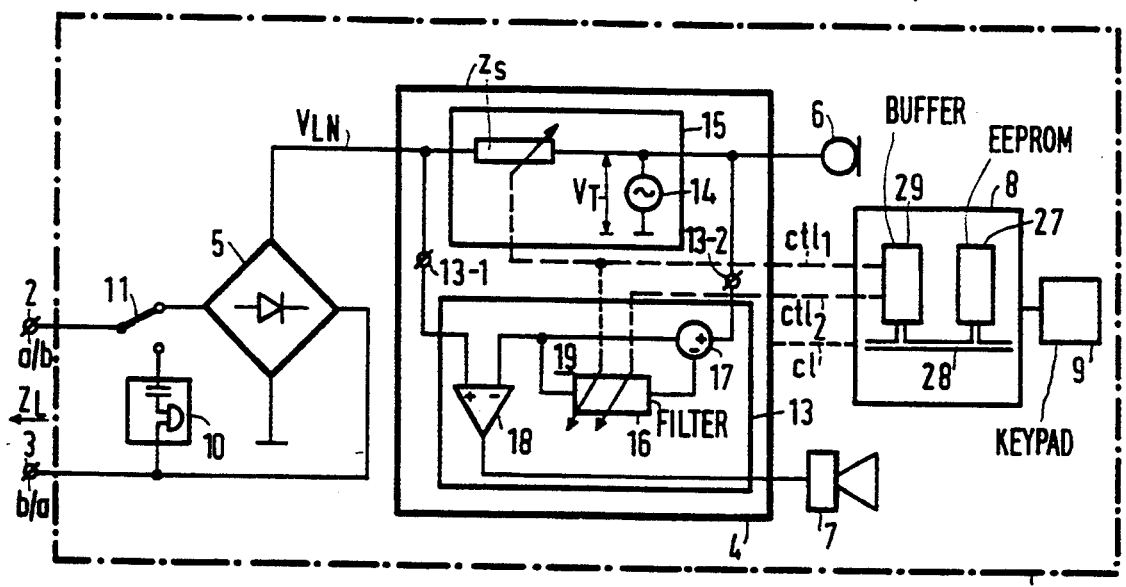
FIG. 1 shows diagrammatically a terminal station in accordance with the invention.

FIG. 1 shows diagrammatically a terminal station 1 for communication by wire. The terminal station 1 comprises connection terminals 2 and 3, denoted by the references a/b and b/a as usual, for connecting the terminal station to a transmission line, for example a subscriber line of a telecommunication network. When the terminal station is connected to the line, the terminal station sees the line impedance $Z_L$. The terminal station 1 comprises a transmission circuit 4 which is connected via a bridge circuit 7. The transmission circuit comprises a line termination impedance $Z_S$. The transmission circuit 4 couples a telephone loudspeaker (or earpiece) and a microphone, usually accommodated in a telephone receiver (not shown), to the subscriber line for receiving and transmitting speech signals from and to the line, respectively. For control of the transmission circuit 4 there is provided a control device 8 whereto a keypad 9 is connected. The control device may be a microcontroller specifically designed for telephony purposes. The microcontroller 8 inter alia serves to convert, during dialling, the signals supplied by the keypad into either pulse signals for the transmission circuit 4 in order to interrupt the line current in a pulse-like manner when the terminal station 1 is arranged for pulse dialling, or to convert these signals into tone dialling signals for the transmission circuit if the terminal station is arranged for tone signalling. The terminal station also comprises a ringing device 10 which, in the on-hook condition, is connected to the line, via the position of a cradle contact 11, in order to ring the subscriber in the event of an incoming call.

Because the signals originating from the network may not be reflected by the terminal station 1 when the latter is connected to the telecommunication network, the impedance $Z_s$ should be matched as well as possible with the line impedance $Z_L$. In order to obtain suitable line matching, the termination impedance $Z_s$ should satisfy the requirements imposed by network management authorities.

The required termination impedances may differ from one country to another and are also dependent on the length of the line. The realisation of such a termination impedance $Z_s$ does not form part of the present invention.

A signal originating from the line forms a signal voltage, denoted by the reference $V_{LN}$ in FIG. 1, across the termination impedance $Z_s$. Via an input terminal 13-1, the signal voltage is applied to the anti-sidetone circuit 13 which outputs the signal, possibly after amplification, to the telephone loudspeaker 7. It is to be noted that the termination impedance $Z_s$ is formed by means of an electronic circuit 15 which is not described in detail, so that it is virtually grounded for the signal voltage $V_{LN}$ on the other side, subsequent to the line terminations $Z_s$.

A signal supplied by the microphone 6, being a signal voltage $V_T$ symbolically represented in the Figure by an alternating voltage source 14 with a signal voltage $V_T$ which is connected between virtual ground and the line termination impedance $Z_s$, is applied, via the termination impedance $Z_s$, to the transmission line connected to the connection terminals 2 and 3. The sub-voltage formed across the line impedance $Z_L$ of the transmission line, however, is also applied to the input terminal 13-1 of the anti-sidetone circuit 13. In order to prevent this signal from reaching the telephone loudspeaker 7, the signal voltage $V_T$ supplied by the microphone is applied directly to the input terminal 13-2 of the anti-sidetone circuit 13.

In accordance with the invention, the anti-sidetone circuit 13 comprises a filter 16 which is included in the feedback path of a feedback loop or circuit 19. More specifically, the feedback circuit 19 also comprises an adder device 17 and the anti-sidetone circuit comprises a differential amplifier 18 which receives the signal voltage present for the line connection terminals 2 and 3 as well as the signal voltage supplied by the feedback circuit.

Figure 2:
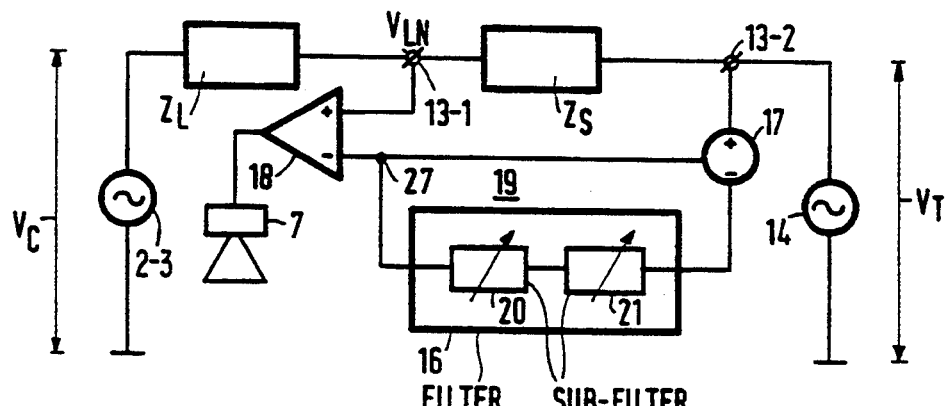
FIG. 2 shows an equivalent diagram of an anti-sidetone circuit of a terminal station in accordance with the invention.

The operation of the anti-sidetone circuit 13 will be described in detail hereinafter with reference to FIG. 2 which shows the equivalent diagram of the part of the transmission circuit 4 shown in FIG. 1.

In said equivalent diagram the signal source present at the other end of the transmission line is denoted by the reference 2-3 and the signal voltage supplied by said source 2-3 is denoted by the reference $V_c$.

As has already been stated, the signal voltage $V_c$ supplied by the signal source 2-3 produces a line alternating voltage $V_{LN}$ at the input terminal 13-1, said voltage being applied to the differential amplifier 18. Because of the virtual ground of the input terminal 13-2, this input terminal will not carry a signal voltage originating from the source 2-3. Consequently, the entire line alternating voltage $V_{LN}$ is applied, possibly after amplification by the differential amplifier 18, to the telephone loudspeaker 7.

A voltage signal $V_T$ supplied by the signal source 14 produces a signal voltage at the connection terminal 13-1 which amounts to:

$$V_T \cdot Z_L/(Z_L + Z_s) \qquad (1)$$

The signal voltage supplied by the signal source 14, via the connection terminal 13-2, to the other input terminal of the differential amplifier is denoted by the reference $V_i$.

For $V_i$ it holds that $$V_i = V_T - F V_i,$$

where F is a transfer function of the filter 16.
Consequently, $$V_i = V_T/(1+F) \qquad (2)$$

The differential amplifier 18 functions as a comparison circuit whose output is applied to the telephone loudspeaker 7. In order to ensure that the signal from the signal source 14 is not applied to the telephone loudspeaker 7, the voltages represented in the equations 1 and 2 should be made equal. This means that $$\frac{1}{1+F} = \frac{Z_L}{Z_L + Z_S} = \frac{1}{1 + Z_S/Z_L}$$

This condition can be satisfied by choosing the transfer function F to be equal to $$Z_s/Z_L \qquad (3)$$

This embodiment offers the major advantage that merely the ratio of the impedances $Z_s$ and $Z_L$ need be absolutely accurate, and not the individual impedances. In this respect an anti-sidetone circuit 13 constructed so as to include a filter 16 provided in the feedback path of a feedback loop 19 is particularly suitable for integration.

Because the filter 16 contains the ratio of the line termination impedance $Z_s$ and the line impedance $Z_L$, a further simplification can be obtained by subdividing the filter 16 into two cascade-connected sub-filters 20 and 21.

The transfer function F' of the filter 20 can be chosen equal to $Z_s/R_N$, the transfer function F'' of the filter 21 then being equal to $R_N/Z_L$, and the resistance value of $R_N$ being chosen at random. The subdivision of the filter 16 into two sub-filters 20 and 21 and the standardization of the line termination impedance $Z_s$ and the line impedance $Z_L$ with an arbitrary value of $R_N$ enables a further simplification of the filter 16 with the transfer function F in integrated form.

This will be described in detail hereinafter with reference to the transfer characteristics of the filter 16 and the sub-filters 20 and 21 shown in FIG. 3.

Figure 3:
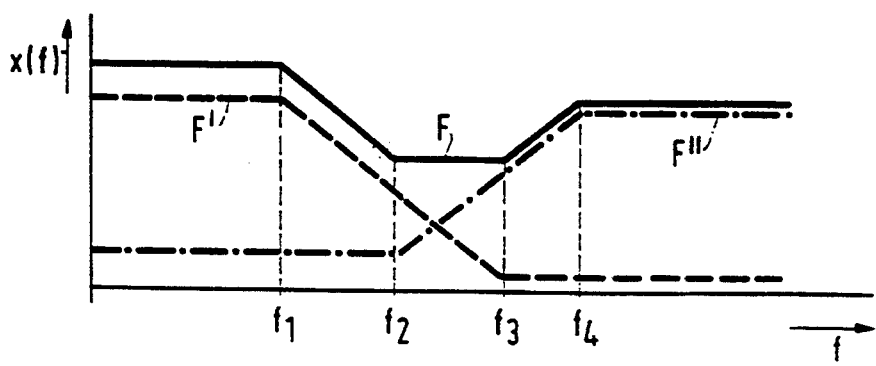
FIG. 3 shows transfer characteristics of filters used in the terminal station in accordance with the invention.

The transfer function F to be realised by the filter 16 is represented by a solid line in FIG. 3. By forming this transfer function as the sum of the transfer functions F', F'', denoted by the dashed line and the dash-dot line, respectively, a simpler realisation is possible because the sub-filter 20 has only one pole at $f_1$ and a zero point at $f_3$, the sub-filter 21 having a zero point at $f_2$ and a pole at $f_4$.

Figure 4:
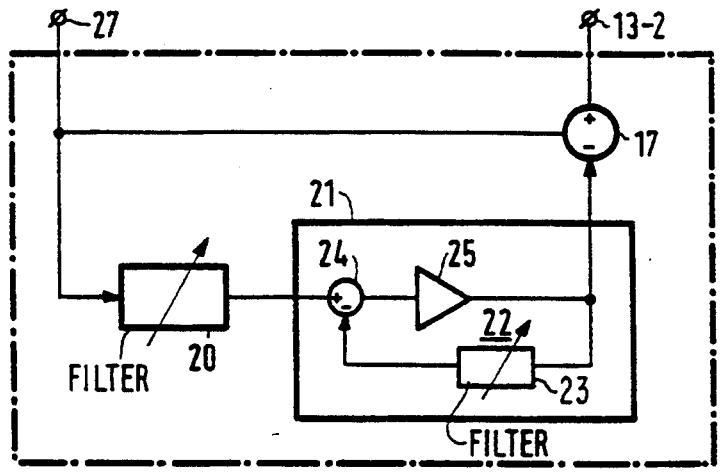
FIG. 4 shows an equivalent diagram of another embodiment of an anti-sidetone circuit of the terminal station in accordance with the invention.

FIG. 4 shows an example of a further simplified embodiment of the filter 16. The sub-filter 21 comprises an auxiliary filter 23 which is included in the feedback path of an additional feedback loop 22 and which has a transfer characteristic $F_i''$ which, as will be demonstrated hereinafter, is the inverse of the transfer function F'' of the sub-filter 21. More specifically, the sub-filter 21 comprises a further adder device 24 and an amplifier which is included in the forward branch of the additional feedback loop 22 and which has a gain factor A.

It can be simply demonstrated that the transfer function of this sub-filter is $$\frac{A}{1 + AF_i''} \quad (4)$$

If A is large, the transfer function is substantially equal to $$\frac{1}{F_i''} \quad (5)$$

The transfer function of this sub-filter was chosen to be equal to $R_N/Z_L$, which means that the transfer function $F_i''$ of the auxiliary filter 23 equals $Z_L/R_N$.

This embodiment offers the advantage that the auxiliary filter 23 can be realised in the same way as the transfer function $Z_S/R_N$ for the sub-filter 20.

The advantage of the subdivision of the filter 16 into the sub-filters 20 and 21 resides in the fact that the sub-filter 20 is composed of the normalized line termination impedance $Z_S$.

This means that upon realisation of this filter, the line termination impedance $Z_S$ already realised in integrated form is to be doubled on the chip. The filter 20 can then also be realised as a duplicate of the line termination impedance $Z_s$ normalized to $R_N$. This advantage exists notably when the line termination impedance $Z_s$ is controllable, for example, when it can be matched with a predetermined line impedance $Z_L$ specified by the network authorities. The auxiliary filter 23 of the sub-filter 21 can be adjusted in a corresponding manner.

To this end, as is shown in FIG. 1, the control device 8 comprises not only the customary devices (not shown) such as a processor, a RAM, etc., but also a programmable read-only device 27 which is coupled to a bus 28. The programmable read-only device may be a so-called EEPROM (Electrically Erasable Programmable Read-Only Memory) in which control information for adjustment of the line termination impedance $Z_s$, and hence also of the transfer function F' of the sub-filter 20 and of the transfer function $F_i''$ of the auxiliary filter 23, is stored.

When the terminal station 1 is switched on, the microcontroller derives the control signals $ctl_1$ and $ctl_2$ from the EEPROM information and applies these signals, via a coupling circuit (interface) 29, to the transmission circuit 4. The interface 29 may be a buffer, the output of which carries the control signals $ctl_1$ and $ctl_2$ in binary form after activation of the terminal station 1.

Realisation of the filter 16 in analog integrated form is virtually impossible because of the low pole and zero point frequencies of the filter specified by the line impedance $Z_S$; this would require an excessively large chip surface area and, moreover, could not be realised with the desired accuracy. Therefore, in an attractive embodiment of the invention the filter 16 is constructed as a filter with switched capacitances or switched currents. The pole and zero point pattern of filters with switched capacitances is defined by capacitance ratios in the filter and the clock frequency of the filter. Because of the fact that filter properties are defined by capacitance ratios, no absolutely accurate capacitances are required. For a more detailed description of filters with switched currents, reference is made to a variety of literature, for example the handbook "Analog MOS Integrated Circuits for Signal Processing", R. Gregorian et al, Wiley 1986. An embodiment of the filter 16 in the form of a filter with switched capacitances can also be convened into a filter with switched currents. For such conversion reference is made to the article "Switched current filters", J. B. Hughes et al, IEEE Proceedings, Vol. 137, Pt. G, No. 2, April 1990, pp. 156–162. When the filter 16 is constructed as a filter with switched capacitances, the filter 16 also comprises a clock input for receiving a clock signal cl. The clock signal cl, whose frequency is adjustable, can be supplied by the control circuit 15. The other components are also integrated as much as possible. In the embodiment shown, the terminal set 1 functionally consists essentially of two integrated circuits, because separate ICs for the transmission circuit and for control are still demanded by OEMs. Ultimately, as integration progresses the transmission circuit 4 and the control device 8 will be integrated in a single IC.

Figure 5:
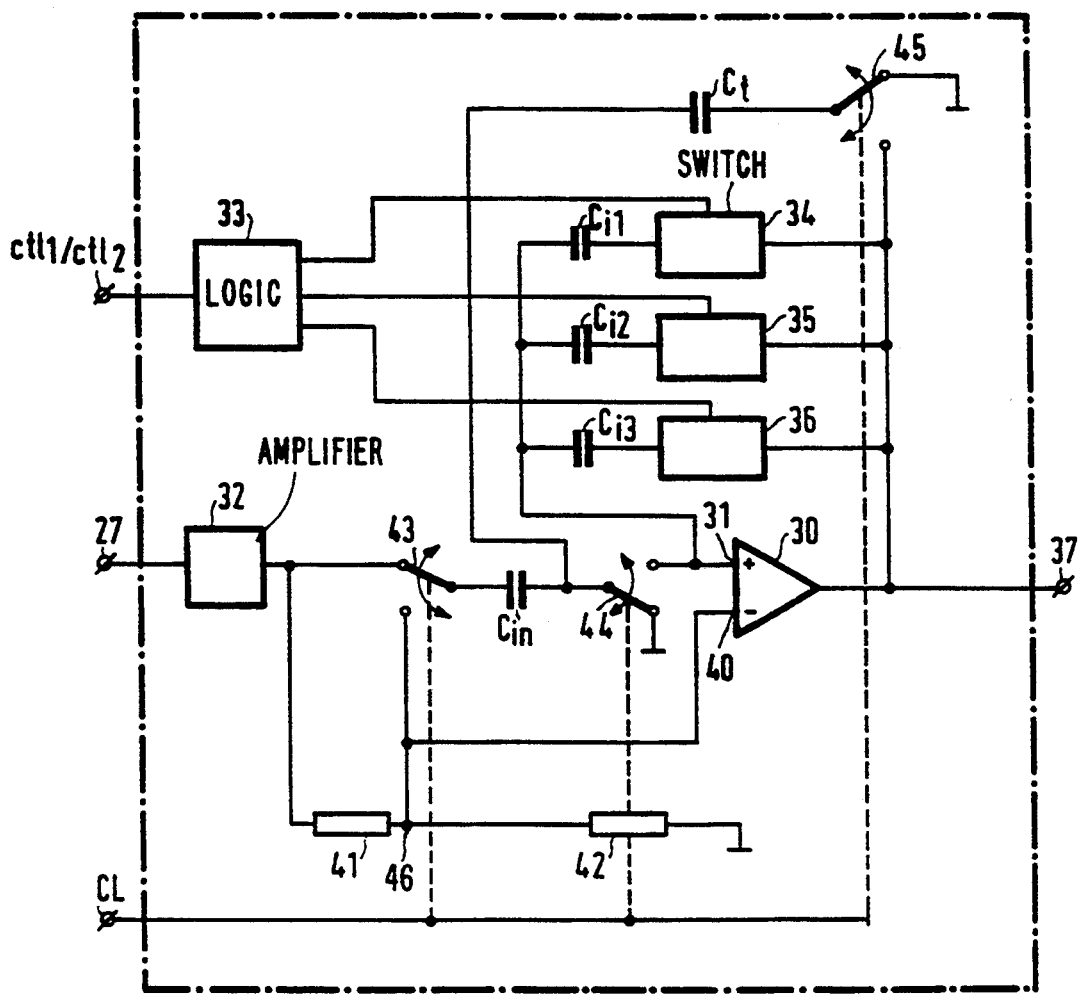
FIG. 5 shows an embodiment of a filter of a terminal station in accordance with the invention.

FIG. 5 shows an embodiment of the filter 16 in accordance with the invention, using a first-order filter with switched capacitances; this filter may be the auxiliary filter 23 as well as the sub-filter 20. The filter 20/23 comprises an operational amplifier 30, an inverting input 31 of which receives, via a switched input capacitance $C_{in}$ and via an amplifier 32, the voltage supplied by the adder device 17 and the amplifier 25, respectively. The filter 20/23 furthermore comprises a switched, fixed feedback capacitance $C_t$ and a number of integration capacitances $C_{i1}$, $C_{i2}$ and $C_{i3}$ which can be switched on via multiplexing. The number of integration capacitances shown is not restricted to three, extension being simply possible. The integration capacitances can be connected, via a logic circuit 33, between an output 37 of the operational amplifier 30 and the input 31 by switches 34, 35 and 36, for example integrated MOS-FETs. The logic circuit 33, being driven by the binary control signal $ctl_1/ctl_2$ from the control device 5, supplies control signals for the switches 34, 35 and 36. The output 37 also constitutes the output of the filter and serves to couple the filter to the adder circuit 24 shown in FIG. 4. The first-order transfer of the filters 20/23 comprises a pole and a zero point. The position of the pole is a function of the ratio of the feedback capacitance $C_t$ to the integration capacitance $C_i$, and also of the clock frequency cl. The frequency behaviour of the filter, therefore, can be simply adjusted. When the clock signal is absent, a non-inverting input 40 of the operational amplifier 30 is coupled at the output side to the differential amplifier 32 via a voltage divider consisting of the resistors 41 and 42. During operation, the clock signal cl switches the capacitances $C_{in}$ and $C_t$ by means of the switches 43, 44 and 45. When the clock signal fails, a resistive termination of given value can thus be activated. A tapping point 46 of the resistors 41 and 42 is connected, as shown, to the input 40 of the operational amplifier 30, but can also be connected directly to the adder circuit 17/24. Furthermore, the input capacitance $C_{in}$ and at least one of the resistors 41 and 42 may be constructed so as to be variable and digitally adjustable, like the integration capacitance $C_i$; however, this is not shown here. As a result, the gain of the filter with switched capacitances 20/23, being a function of the ratio of the capacitances $C_{in}$ and $C_t$, is also variable. In order to shift back a zero point which has been shifted due to adjustment of the gain, the resistance value of at least one of the resistors is varied.

When information relating to the magnitude of the line current is applied to the microcontroller 8, the filter transfer functions F' and F" can be varied as a function of the line length and the anti-sidetone circuit 13 can be compensated with respect to the length of the line. This compensation can be performed in the same way as described above for matching the filters with the input impedance of the terminal station specified by the authorities. In other words, this can be performed by means of additional tables of values of control signals, stored in the microcontroller 8, for adjustment of the filters 20/23 in dependence on the length of the transmission line.

We claim:

1. An audio terminal station for telecommunication by wire, comprising:
    two connection terminals for connecting the station to a wire transmission line,
    a microphone and an audio output device, and
    a coupling circuit for coupling said microphone to said connection terminals and coupling said output device to said connection terminals,
    said coupling circuit including a termination impedance connected in series between said microphone and one of said connection terminals, and an anti-sidetone circuit for minimizing coupling of a signal from the microphone to said output device,
    characterized in that said anti-sidetone circuit comprises a feedback loop having a feedback path which includes a filter, said feedback loop being arranged such that, responsive to said microphone signal, the feedback loop produces an output signal substantially equal to a signal generated across said connection terminals by said microphone signal, and further characterized in that said anti-sidetone circuit comprises comparison means having two inputs and an output, said output signal being connected to one of said inputs, said one of said connection terminals being connected to the other of said inputs, and said output device being connected to said output.

2. A station as claimed in claim 1, characterized in that said filter consists of two normalized sub-filters connected in cascade.

3. A station as claimed in claim 2, characterized in that one of said sub-filters comprises an additional feedback loop having an additional feedback path and an auxiliary filter in said additional feedback path, and
    said auxiliary filter has a transfer function which is a reciprocal of the transfer function of said one sub-filter.

4. A station as claimed in claim 1, characterized in that the transfer function of said filter is adjustable, and
    said station comprises a control unit connected to control said filter to have an impedance based on a ratio of the termination impedance to the line impedance of said wire transmission line.

5. A station as claimed in claim 1, characterized in that said filter includes a plurality of switched capacitances.

6. A station as claimed in claim 1, characterized in that said comparison means comprises a differential amplifier.

7. An audio terminal station for telecommunication by wire, comprising:
    two connection terminals for connecting the station to a wire transmission line,
    a microphone and an audio output device, and
    a coupling circuit for coupling said microphone to said connection terminals and coupling said output device to said connection terminals,
    said coupling circuit including a termination impedance connected in series between said microphone and one of said connection terminals, and an anti-sidetone circuit for minimizing coupling of a signal from the microphone to said output device,
    characterized in that said anti-sidetone circuit comprises a feedback loop having a feedback path which includes a filter, said feedback loop being arranged such that, responsive to said microphone signal, the feedback loop produces an output signal substantially equal to a signal generated across said connection terminals by said microphone signal,
    and further characterized in that said filter consists of two normalized sub-filters connected in cascade,
    one of said sub-filters comprises an additional feedback loop having an additional feedback path and an auxiliary filter in said additional feedback path, and
    said auxiliary filter has a transfer function which is a reciprocal of the transfer function of said one sub-filter.

8. A station as claimed in claim 7, characterized in that the transfer function of said filter is adjustable, and
    said station comprises a control unit connected to control said filter to have an impedance based on the ratio of the termination impedance to the line impedance of said wire transmission line.

9. A station as claimed in claim 8, characterized in that said filter includes a plurality of switched capacitances.

* * * * *